(No Model.)

S. SAUCERMAN.
BUILDING FOR STORING AND FEEDING HAY.

No. 440,369. Patented Nov. 11, 1890.

Witnesses:
R. H. Orwig
M. P. Smith

Inventor:
Samuel Saucerman
By Thomas G. Orwig, Attorney

UNITED STATES PATENT OFFICE.

SAMUEL SAUCERMAN, OF DES MOINES, IOWA.

BUILDING FOR STORING AND FEEDING HAY.

SPECIFICATION forming part of Letters Patent No. 440,369, dated November 11, 1890.

Application filed May 20, 1890. Serial No. 352,542. (No model.)

*To all whom it may concern:*

Be it known that I, SAMUEL SAUCERMAN, a citizen of the United States of America, and a resident of Des Moines, in the county of Polk and State of Iowa, have invented a Building for Storing, Curing, and Feeding Hay, of which the following is a specification.

My object is to facilitate storing, curing, and feeding hay or fodder of any kind and to prevent waste thereof; and it consists in the combination of sliding frames, feed-racks, and adjustable wall-sections with a building, and in certain details of construction hereinafter more clearly set forth, pointed out in my claims, and illustrated in the accompanying drawings, in which—

Figure 1:
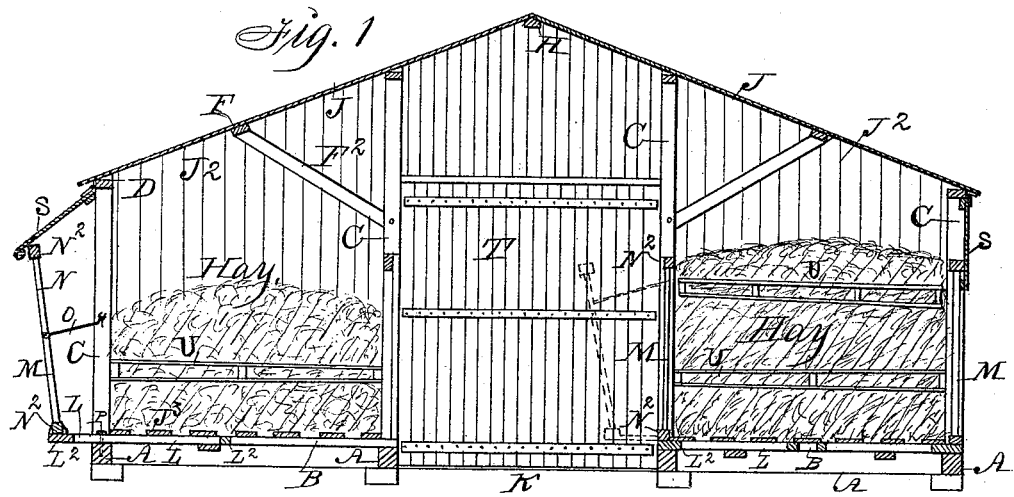
Figure 2:
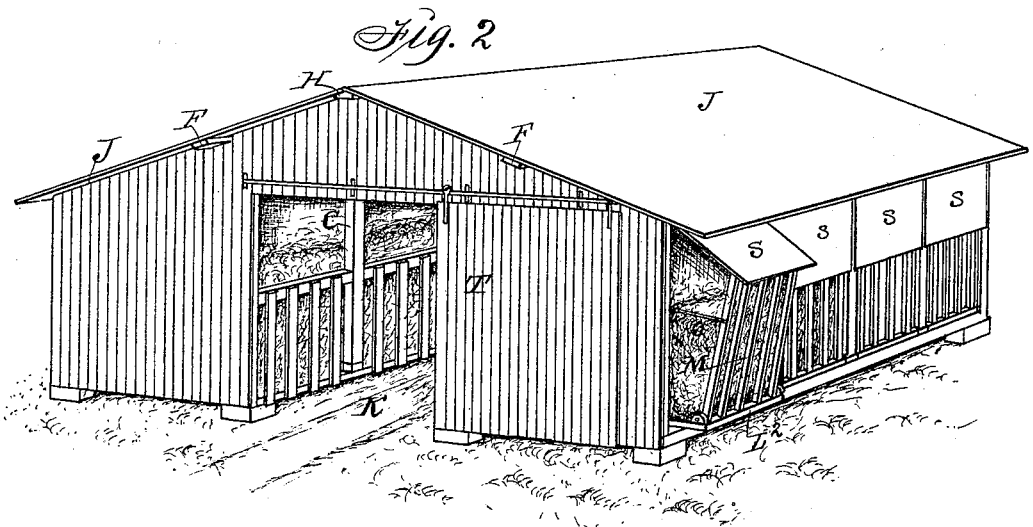
Figure 3:
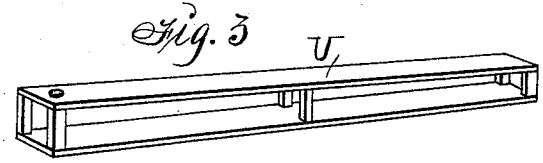

Figure 1 is a cross-section, and Fig. 2 a perspective view, of the complete building partly filled with hay and a rack in position as required for practical use. Fig. 3 is a perspective view of my ventilating-tube.

A are sills, B joists, C posts, D plates, F purlins, $F^2$ purlin-braces, and H the ridge-pole, of the frame of a building adapted to contain hay.

J is the covering for the roof, and $J^2$ is the covering for the outer end walls of said frame, and $J^3$ are floor-boards.

K represents the driveway through the middle portion of the building.

L are sliding bars, connected at their ends by bars $L^2$ to produce a frame adapted to rest on the sills and slide back and forth thereon, for the purpose of supporting and carrying an adjustable feed-rack or wall-section adapted to be used as a feed-rack.

M is a section of the side wall hinged to the outer end of the sliding frame. It is composed of upright strips N, fixed at each end to cross-pieces $N^2$, and spaces between said strips adapt it to be used as a feed-rack. It is hinged at its lower end to the outer end of the horizontally-sliding frame.

O is a rod having a hook at one end hinged to the rack M and adapted to hook into a staple fixed in one of the posts C.

P is a pin adapted to enter perforations in the bars L and the sill A to hold the sliding frame in a stationary position.

S is an adjustable section of the side wall, hinged to the plate D at its upper end and adapted to be swung outward to produce a roof over the feed-rack, and to be supported by the section M when in position to be used as a feed-rack. One of the inside walls is also provided with hinged sections adapted to be used as racks, as indicated by dotted lines in Fig. 1.

T represents doors adapted to close the openings of the driveway K.

U represents tapering tubular and slotted ventilators adapted to be placed at intervals upon the hay as it is stored when brought from the field, to aid in curing the hay and preventing souring and dust. To make one of these ventilators, I connect two boards by means of cross-pieces, so that they will be farther apart at one end of the ventilator than at the other, and adapted to be readily pulled from the hay horizontally outward between the strips N in the side walls.

In the practical use of my invention I place the hay in the building by throwing it over the tops of the lower sections of the walls and feed-racks. When the hay is new or green, placing numbers of my ventilators therein causes air to circulate freely through the mass, as required to prevent the hay from becoming damaged by being packed and heated.

When I desire to feed stock in pleasant weather, I adjust the wall-sections M by drawing the sliding frames L outward any desired distance, and then secure them by means of the pin P. I then incline the sections M and secure them by means of the hooked rod O. At the same time that I adjust the sections M, I lift the lower end of the sections S and allow said sections S to rest upon the top end of the sections M, thus protecting the hay that may be placed within said rack. When the weather is cold or stormy, or for other reasons it is desired to protect the stock, I adjust the sections M in the inner wall, so that the animals can occupy the driveway, where they will be protected by means of the hay as well as by the building.

It is obvious that the racks thus produced at the side of the hay can be readily filled with hay by a person inside of the building by simply pushing the hay outward into the rack by means of a fork or in any suitable way without being exposed to the weather and without danger from contact with the animals.

I claim as my invention—

1. In a building for storing and feeding hay, the combination of a horizontally-sliding frame fitted to bearings or sills connected with the frame of the building, and an adjustable wall-section or feed-rack attached to the outer end of the sliding frame, for the purposes stated.

2. In a building for storing, curing, and feeding hay, a horizontally-sliding frame L and hinged wall-section M, in combination with the sills and posts of the main frame, as and for the purposes stated.

3. A building for storing, curing, and feeding hay, composed of a suitable supporting-frame and covering therefor, sliding frames L, and hinged wall-sections M and S, as shown and described, for the purposes stated.

SAMUEL SAUCERMAN.

Witnesses:
CHAS. C. BULKLEY,
THOMAS G. ORWIG.